United States Patent
Nakagawa et al.

(10) Patent No.: US 6,741,305 B2
(45) Date of Patent: May 25, 2004

(54) COLOR DISPLAY DEVICE (75) Inventors: Hidetoshi Nakagawa, Mie (JP); Takahiro Nishino, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/370,718

(22) Filed: Feb. 24, 2003

(65) Prior Publication Data

US 2003/0160916 A1 Aug. 28, 2003

(30) Foreign Application Priority Data

Feb. 28, 2002 (JP) ........................................ 2002-054803

(51) Int. Cl.⁷ ................................................. G02F 1/13
(52) U.S. Cl. ....................................................... 349/106
(58) Field of Search ........................................... 349/106

(56) References Cited

U.S. PATENT DOCUMENTS 5,910,829 A * 6/1999 Shimada et al. ............ 349/110
6,307,606 B1   10/2001 Takii et al.
6,348,958 B1 * 2/2002 Matsuoka et al. .......... 349/106

FOREIGN PATENT DOCUMENTS

JP        2000-249823 A     9/2000

* cited by examiner

Primary Examiner—James A. Dudek
(74) Attorney, Agent, or Firm—Nixon & Vanderhye P.C.

(57) ABSTRACT

A color display device includes: a first substrate and a second substrate opposing each other via a display medium layer interposed therebetween; a plurality of pixel electrodes arranged in a matrix pattern on one side of the first substrate; a common electrode formed on one side of the second substrate so as to oppose the plurality of pixel electrodes; and a plurality of color filter layers each having a different color formed between the second substrate and the common electrode. The common electrode and the color filter layers of different colors have a display area superposed on the plurality of pixel electrodes and a frame area outside a periphery of the display area. At least one of the plurality of color filter layers of different colors is continuous across a boundary between the display area and the frame area and is flat.

13 Claims, 6 Drawing Sheets

FIG. 5A (a) Washing (b) Lamination

(c) Film peeling (d) Exposure (e) Cushion layer development (f) CF layer development Repeat (b) to (f) twice

FIG. 5B (g) Lamination (h) Film peeling (i) Rear-side exposure (j) Cushion layer development

COLOR DISPLAY DEVICE

BACKGROUND OF THE INVENTION

1. Field of the Invention

The present invention relates to a color display device such as a color liquid crystal display device. A color display device of the present invention can be used in a direct-view type of liquid crystal display such as a liquid crystal color television, or a projection type of liquid crystal display such as a liquid crystal projector.

2. Description of the Background Art

An example of a color display device is a color liquid crystal display device including an active matrix substrate on which a plurality of active elements such as TFTs are formed, a color filter substrate on which color filter layers of different colors and a common electrode are deposited in this order, and a liquid crystal layer interposed between the substrates. The active matrix substrate includes a plurality of pixel electrodes arranged in a matrix pattern, and the plurality of pixel electrodes define a display area of the display device. Moreover, the active matrix substrate includes scanning signal lines and video signal lines, which are connected respectively to the plurality of pixel electrodes via TFTs. The scanning signal lines and the video signal lines extend out of the display area into an area outside the display area. The area outside the display area is called "frame area" or "outer frame area".

Elements formed in the frame area of the active matrix substrate include a scanning driver connected to the scanning signal lines, a data driver connected to the video signal lines, signal input terminals connected to these drivers, a plurality of common transition electrodes for supplying a voltage from the signal input terminals to the common electrode on the color filter substrate. The common transition electrodes are connected to the common electrode in the frame area via a conductive paste.

However, the common electrode is made of a transparent conductive material such as ITO, and thus has a greater electric resistance than that of an electrode made of a metal material such as aluminum. Therefore, a brightness gradient, a display non-uniformity, or the like, may occur due to, for example, a delay in the polarity inversion signal, and these problems are more likely to occur in large liquid crystal display devices.

In order to prevent the delay in the polarity inversion signal, it is necessary to reduce the resistance of the common electrode. One possible way to reduce the resistance of the common electrode is to increase the thickness of the common electrode. With such an approach, although the resistance is reduced, the tact time increases. Therefore, the production efficiency decreases, and the production cost increases as the tact time increases. In addition, since the transparent electrode is not completely transparent, the transmittance of the entire screen decreases as the thickness thereof increases.

Another possible way is to increase the number of contact points between the common electrode and the conductive paste. With such an approach, however, the tact time, and thus the production cost, increases, and the number of common transition electrodes formed on the active matrix substrate also increases. In recent years, there is a strong demand for reducing the frame area of display devices, i.e., a demand for increasing, as much as possible, the display area observed by the user while reducing, as much as possible, the frame area around the display area, which does not contribute to the display. When the number of contact points between the common electrode and the conductive paste is increased, the frame area increases, thereby failing to meet the demand for display devices with a reduced frame area. Therefore, increasing the thickness of the common electrode leads to other problems, and the maximum number of common transition electrodes is limited.

The present inventors have obtained the following findings during the development of a color display device that allows for both a reduction in the resistance of the common electrode and a reduction in the frame area.

In the frame area of the color filter substrate, a black matrix (also called "black mask") is formed for the purpose of improving the contrast and the display quality. The black matrix is provided for expressing the same black color as that in a black display, and is formed by patterning a black paste layer or a metal layer. Moreover, Japanese Laid-Open Patent Publication No. 2000-249823 and Japanese Laid-Open Patent Publication No. 2000-352939, for example, disclose forming color filter layers of different colors used in the display area so that color filter layers of at least two colors extend in the frame area in order to reduce the cost by eliminating the black matrix production step.

Figure 7A:
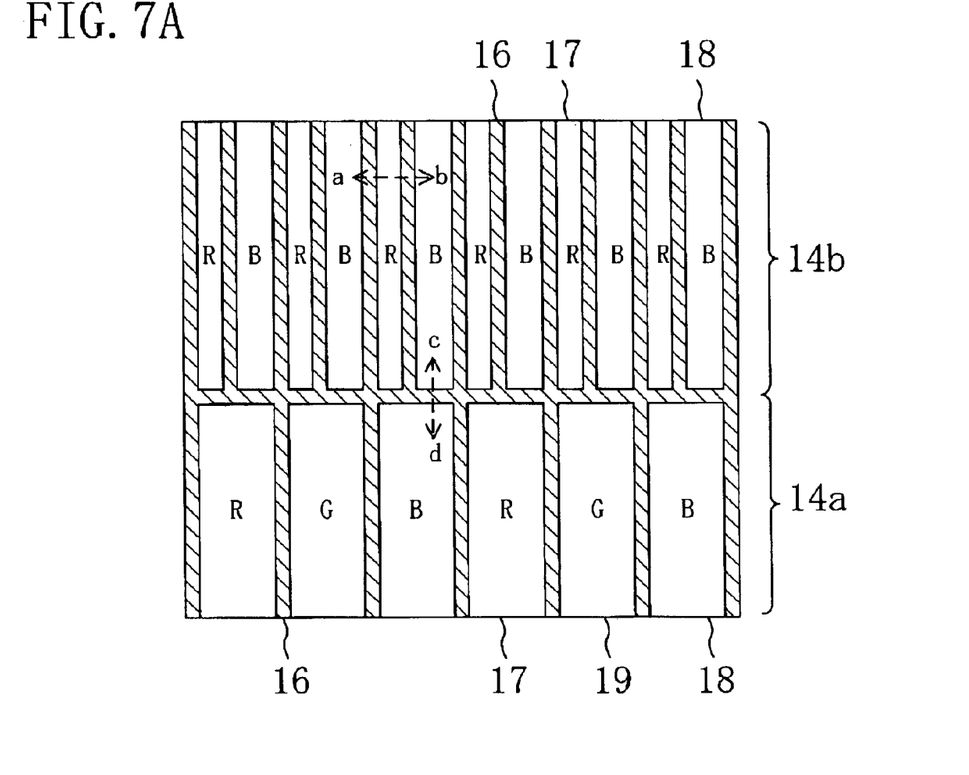
FIG. 7A illustrates an important part of a color filter disclosed in Japanese Laid-Open Patent Publication No. 2000-249823.
Figure 7B:
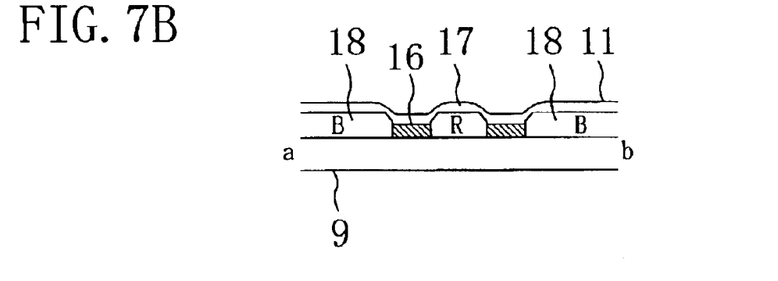
FIG. 7B is a cross-sectional view taken along line a–b in FIG. 7A.
Figure 7C:
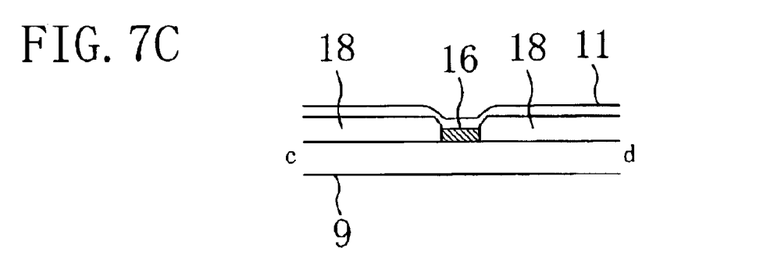
FIG. 7C is a cross-sectional view taken along line c–d in FIG. 7A.

FIG. 7A is a diagram illustrating an important part of a color filter disclosed in Japanese Laid-Open Patent Publication No. 2000-249823. FIG. 7B is a cross-sectional view taken along line a–b in FIG. 7A, and FIG. 7C is a cross-sectional view taken along line c–d in FIG. 7A. In a display area 14a, color filter layers 17, 18, 19 of three primary colors (RGB) are provided in a stripe arrangement. Moreover, in a frame area 14b, the red (R) and blue (B) color filter layers 17 and 18 are provided also in a stripe arrangement.

When the color filter layers are formed by a DFL (Dry Film Lamination) method, dry films of different colors are, one by one, pressed against the substrate while being heated. Since a dry film is typically about 1 $\mu$m to 2 $\mu$m thick, bubbles may occur between a new dry film and an already-formed dry film pattern depending on the resiliency of the dry film to be pressed. In view of this, a gap of 2 $\mu$m or more is provided between dry films of different colors, and a black matrix 16 is formed in the gap. Moreover, the black matrix 16 is patterned so that it also extends along the boundary between the display area 14a and the frame area 14b.

However, it has been found that the color filter has the following problem. As illustrated in FIG. 7C, there is a step between the color filter layer and the black matrix 16 due to the presence of the black matrix 16 between the display area 14a and the frame area 14b. Therefore, the thickness of the common electrode 11 formed on the color filter layers is non-uniform around the step, thereby increasing the resistance of the common electrode 11 between the display area 14a and the frame area 14b. This phenomenon occurs not only when color filters are provided in the frame area, but also when the entire frame area is covered with a black matrix.

Moreover, also in the stripe arrangement in the frame area 14b, the thickness of the common electrode 11 is non-uniform, thereby increasing the resistance of the common electrode 11, due to a step between the colored layers 17 and 18 and the black matrix 16, as illustrated in FIG. 7B. Therefore, in the frame area, particularly in a common transition area where a conductive paste is applied, a potential non-uniformity occurs, thereby lowering the display quality.

Even if only the color filter layers of different colors are provided, without providing the black matrix 16, in the frame area 14b, a dry film being pressed may overlap with the already-formed dry film pattern to cause a step, thereby increasing the resistance of the common electrode 11. In addition, the color filters may overlap with one another, thereby varying the tint due to color mixing.

Furthermore, the present inventors found that the phenomenon is more pronounced when the color filter layer has an irregular surface configuration.

SUMMARY OF THE INVENTION

A color display device according to a first aspect of the present invention includes: a first substrate and a second substrate opposing each other via a display medium layer interposed therebetween; a plurality of pixel electrodes arranged in a matrix pattern on one side of the first substrate that is closer to the display medium layer; a common electrode formed on one side of the second substrate that is closer to the display medium layer so as to oppose the plurality of pixel electrodes; and a plurality of color filter layers each having a different color formed between the second substrate and the common electrode, wherein: the common electrode and the color filter layers of different colors have a display area superposed on the plurality of pixel electrodes and a frame area outside a periphery of the display area; and at least one of the plurality of color filter layers of different colors is continuous across a boundary between the display area and the frame area and is flat. In the present specification, "flat" is used to mean that the difference between the thickness of the thinnest portion of the color filter layer and that of the thickest portion thereof is 1500 Å or less.

In the color display device, at least one of the color filter layers of different colors is continuous across the boundary between the display area and the frame area and is flat. Therefore, the common electrode on the color filter layer has a uniform thickness, and thus a reduced resistance, in the vicinity of the boundary between the display area and the frame area. Thus, the potential non-uniformity in the common electrode is eliminated, thereby improving the display quality.

In the color display device according to the first aspect of the present invention, it is preferred that the first substrate includes, in the frame area, a common transition electrode that is connected to the common electrode via a conductive member; the common electrode includes a common transition section in an area that is superposed on the common transition electrode; and at least one of the plurality of color filter layers of different colors in an area that is superposed on the common transition section extends continuously into the display area and is flat.

Thus, a portion of the common electrode having a uniform thickness is formed extending from the common transition section into the display area. Therefore, the common electrode has a reduced resistance in this portion, whereby the potential non-uniformity in the common electrode is eliminated, thereby improving the display quality.

The plurality of color filter layers in the display area may be color filter layers of three colors of red, green and blue; the plurality of color filter layers in the frame area may be color filter layers of two colors of red and blue; the color filter layer continuous across the boundary may be a blue color filter layer; and an area of the blue color filter layer in the frame area may be greater than that of the red color filter layer in the frame area.

A color display device according to a second aspect of the present invention includes: a first substrate and a second substrate opposing each other via a display medium layer interposed therebetween; a plurality of pixel electrodes arranged in a matrix pattern on one side of the first substrate that is closer to the display medium layer; a common electrode formed on one side of the second substrate that is closer to the display medium layer so as to oppose the plurality of pixel electrodes; and a plurality of color filter layers each having a different color formed between the second substrate and the common electrode, wherein: the common electrode and the color filter layers of different colors have a display area superposed on the plurality of pixel electrodes and a frame area outside a periphery of the display area; the first substrate includes, in the frame area, a common transition electrode that is connected to the common electrode via a conductive member; the common electrode includes a common transition section in an area that is superposed on the common transition electrode; and at least one of the plurality of color filter layers of different colors in an area that is superposed on the common transition section extends in two or more in-plane directions and is flat.

In the color display device, at least one of the color filter layers of different colors in the common transition section extends to a location in the frame area, which is apart from the common transition section, while being flat, whereby a portion of the common electrode with a uniform thickness formed on the color filter layer is extended into the frame area. Therefore, a portion of the common electrode having a reduced resistance is extended into the frame area, thereby eliminating the potential non-uniformity in the common electrode.

In the color display device according to the second aspect of the present invention, it is preferred that the at least one of the plurality of color filter layers of different colors extends continuously into the display area and is flat across a boundary between the display area and the frame area.

Thus, a portion of the common electrode having a uniform thickness is formed extending from the common transition section into the display area. Therefore, the common electrode has a reduced resistance in this portion, whereby the potential non-uniformity in the common electrode is eliminated, thereby improving the display quality.

The plurality of color filter layers in the frame area may be color filter layers of two colors of red and blue; and an area of the blue color filter layer in the frame area may be greater than that of the red color filter layer in the frame area.

DETAILED DESCRIPTION OF THE PREFERRED EMBODIMENTS

Preferred embodiments of the present invention will now be described with reference to the drawings. Note that while the following embodiments will be directed to transmission type color liquid crystal display devices, the color display device of the present invention may alternatively be a reflection type or a transmission/reflection type display device. Moreover, the present invention is applicable not only to liquid crystal display devices, but to other devices in which color filter layers and a common electrode are layered together, e.g., an electrophoretic display. Note that the terms "column direction" and "row direction" are used herein merely to represent one direction in the substrate surface and another direction that crosses the first direction (typically perpendicular to the first direction), and do not necessarily correspond to the length and width directions in the substrate surface.

Embodiment 1

Figure 1:
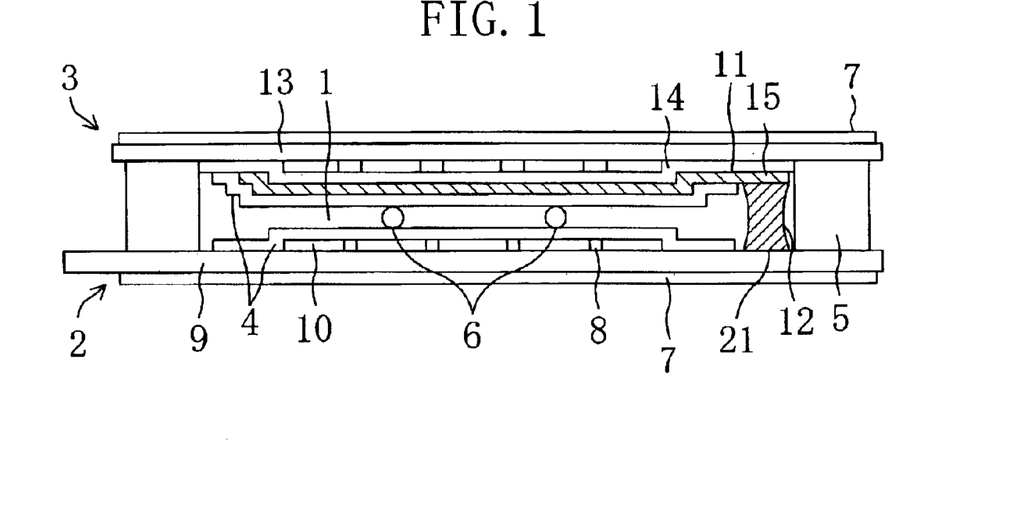
FIG. 1 is a cross-sectional view schematically illustrating a color display device of Embodiment 1.
Figure 2:
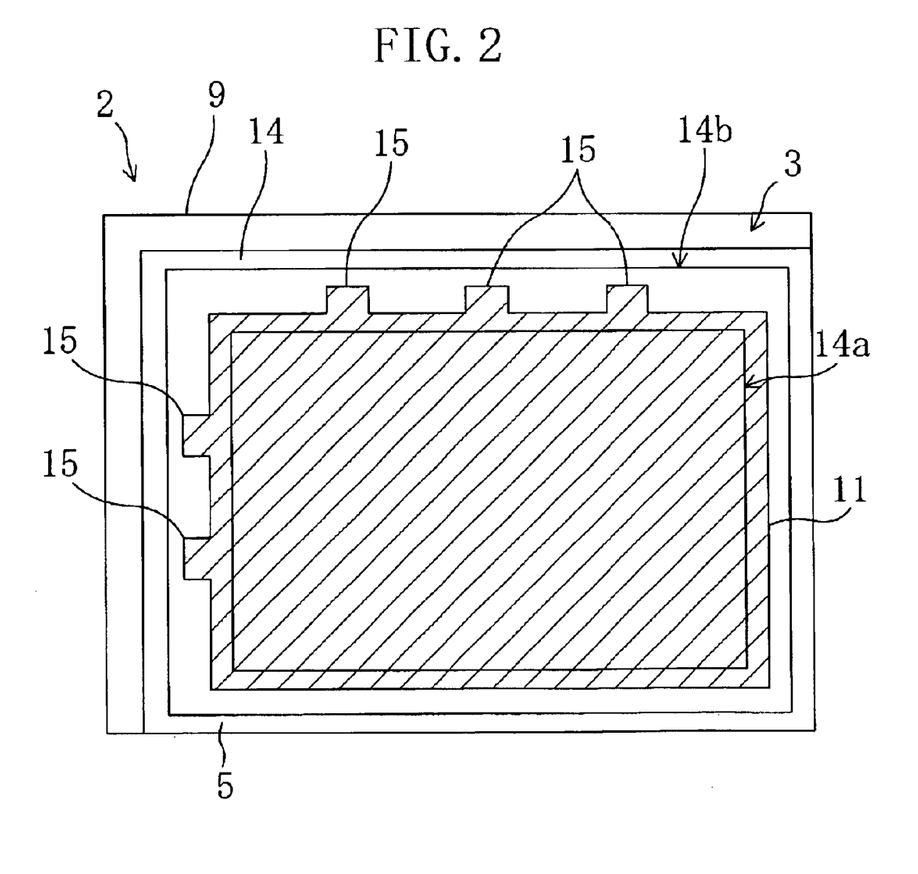
FIG. 2 is a plan view schematically illustrating the color display device of Embodiment 1.

FIG. 1 is a cross-sectional view schematically illustrating a color display device of the present embodiment, and FIG. 2 is a plan view schematically illustrating the color display device of the present embodiment. The color display device of the present embodiment includes a liquid crystal layer 1, an active matrix (hereinafter referred to simply as "AM") substrate 2 and a color filter (hereinafter referred to simply as "CF") substrate 3 opposing the AM substrate 2 with the liquid crystal layer 1 interposed therebetween.

The AM substrate 2 includes a plurality of switching elements 8 arranged in a matrix pattern on a glass substrate 9. Each switching element 8 may be an a-Si (amorphous silicon) type TFT (thin film transistor), a p-Si (polysilicon) type TFT, or the like. A plurality of transparent pixel electrodes 10 are provided so that each switching element 8 is paired with one transparent pixel electrode 10. An alignment film 4 is formed on the switching elements 8 and the transparent pixel electrodes 10.

On the AM substrate 2, a plurality of scanning signal lines extend in parallel to one another, and a plurality of video signal lines extend in parallel to one another so as to cross the plurality of scanning signal lines. The plurality of scanning signal lines and the plurality of video signal lines are connected to the plurality of switching elements 8, respectively. When the switching element 8 is turned ON by receiving a scanning signal from the scanning signal line, a data signal from the video signal line is written to the transparent pixel electrode 10 via the switching element 8. Thus, an electric field is produced between the transparent pixel electrode 10 and the common electrode 11 opposing the transparent pixel electrode 10 to change the orientation of the liquid crystal molecules in the liquid crystal layer 1, thereby changing the transmittance for light passing through the liquid crystal layer 1 and thus displaying an image. The area of the AM substrate 2 on which the plurality of transparent pixel electrodes 10 are formed will be referred to as "display area".

The scanning signal lines and the video signal lines extend into an area outside the periphery of the display area, where they are connected to a gate driver and a source driver, respectively, for driving the signal lines. These drivers are connected to signal input terminals that are connected to a circuit substrate for driving the liquid crystal panel, and the driving of the liquid crystal panel is controlled by signals from the circuit substrate. The gate driver, the source driver and the signal input terminals are all formed in the area outside the periphery of the display area (hereinafter referred to as "frame area"). Furthermore, in the frame area of the AM substrate 2, a plurality of common transition electrodes 21 for supplying a voltage from the signal input terminal to the common electrode 11 on a CF substrate 3. Each common transition electrode 21 is connected to a common transition section 15 of the common electrode 11 via a conductive paste 12 called "common paste".

Figure 3:
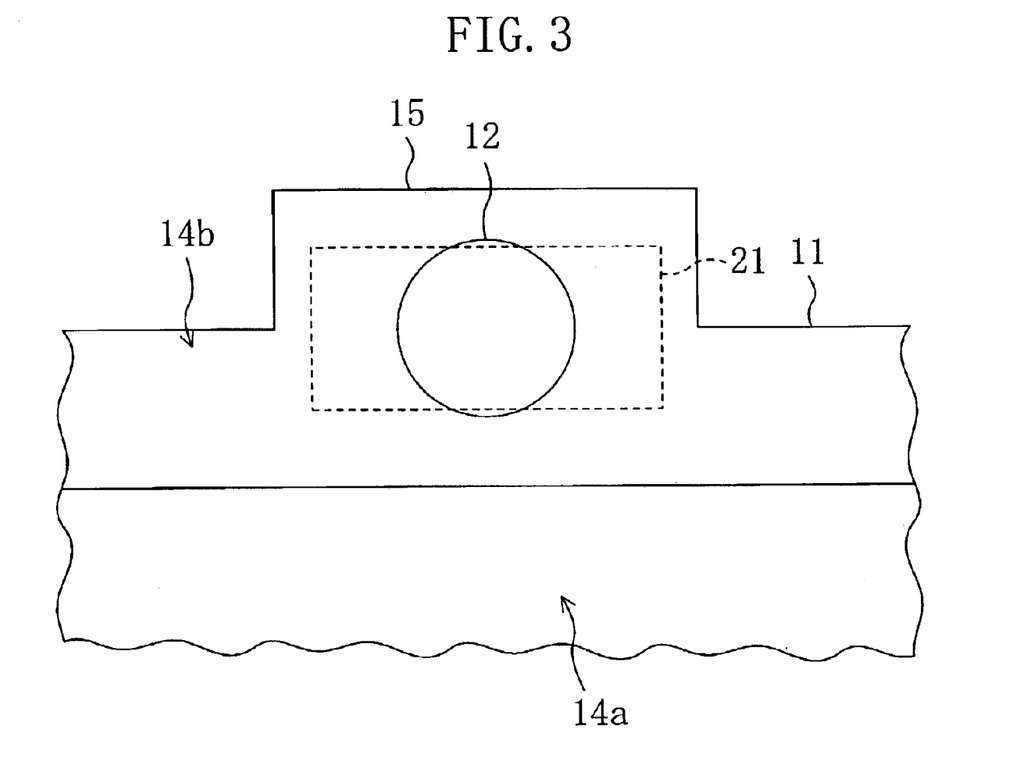
FIG. 3 is a plan view illustrating, on an enlarged scale, a portion of a common electrode 11 of Embodiment 1 around a common transition section 15.

FIG. 3 is a plan view illustrating, on an enlarged scale, a portion of the common electrode 11 around the common transition section 15. Each common transition section 15 is formed in the frame area 14b outside the display area 14a so as to cover an area that is superposed on the common transition electrode 21 on the AM substrate 2. Thus, the circuit substrate is electrically connected to the common electrode 11 on the CF substrate 3 via the signal input terminals, the common transition electrode 21 and the conductive paste 12.

On the other hand, a color filter 14 of three primary colors (RGB) is formed on a glass substrate 13 of the CF substrate 3, and the black matrix 16 is formed to fill the gap between the color filter layers 17, 18 and 19 of different colors. Moreover, the single-piece transparent common electrode 11 is formed on the color filter layers 17, 18 and 19 so as to oppose the plurality of transparent pixel electrodes 10 of the AM substrate 2, and the alignment film 4 is formed on the transparent common electrode 11.

Figure 4A:
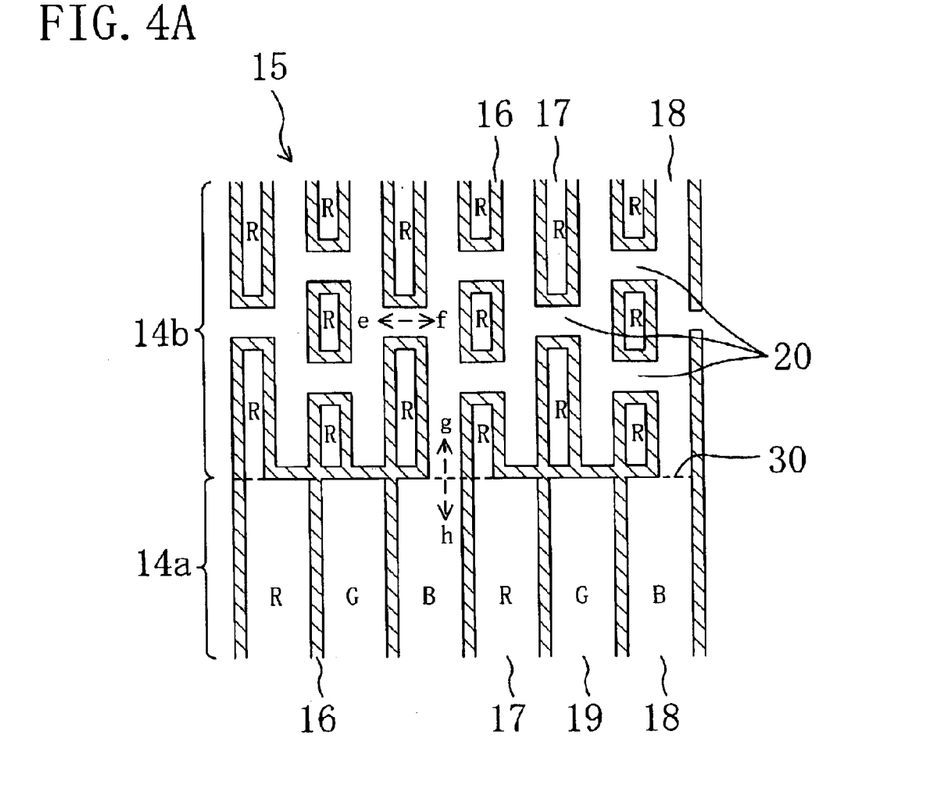
FIG. 4A is a plan view illustrating, on an enlarged scale, a portion of the color display device of Embodiment 1 around a common transition section 15 illustrated in FIG. 2.
Figure 4B:
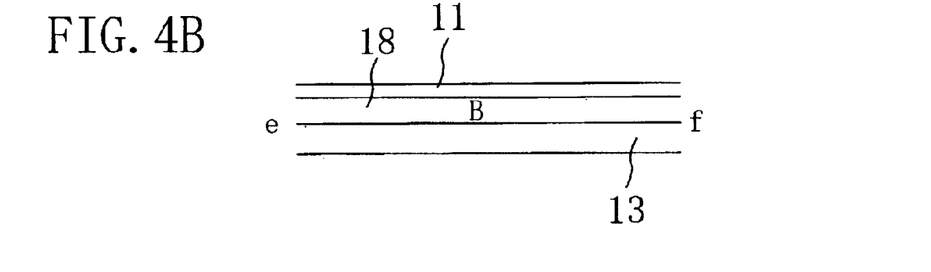
FIG. 4B and FIG. 4C are cross-sectional views taken along line e–f and line g–h, respectively, in FIG. 4A.
Figure 4C:
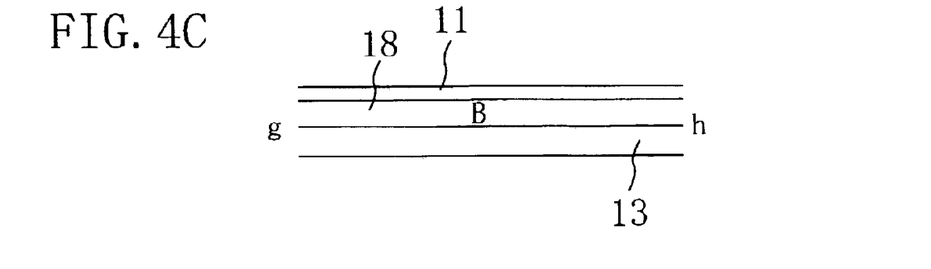

FIG. 4A is a plan view illustrating, on an enlarged scale, a portion of the color display device around the common transition section 15 illustrated in FIG. 2. FIG. 4B and FIG. 4C are cross-sectional views taken along line e–f and line g–h, respectively, in FIG. 4A. In the present embodiment, the color filter layers and the common electrode 11 are formed not only in the display area 14a, which is superposed on the plurality of pixel electrodes 10 on the AM substrate 2, but also in the frame area 14b outside the display area 14a. In the display area 14a of the CF substrate 3, the RGB color filter layers 17, 18 and 19 each having a generally rectangular shape are formed so as to correspond respectively to the transparent pixel electrodes 10 on the AM substrate 2.

In the area of the common transition section 15 and the vicinity thereof (hereinafter, the area of the common transition section 15 including the vicinity thereof will be referred to simply as "common transition section 15 area") in the frame area 14b of the CF substrate 3, the color filter layers 17 and 18 of two colors of read and blue are formed. The color filter layers 17 and 18 of two colors in the common transition section 15 area have smaller widths in the column direction than those of the color filter layers 17 and 18 of the same colors in the display area 14a. Moreover, in the frame area 14b, the red color filter layer 17 has a smaller width in the column direction than that of the blue color filter layer 18.

The planar shapes of the color filter layers 17 and 18 of two colors in the common transition section 15 area can be described as follows. The plurality of blue color filter layers 18 extending in the column direction are connected together via connecting portions 20. Each connecting portion 20 has a rectangular shape and extends in the row direction. The connecting portion 20 along one column is shifted, in the column direction, from another connecting portion 20 along the next column by a predetermined interval. In other words, in the common transition section 15 area, the blue color filter layers 18 extend in the column direction and also in the row direction and are connected together into a single piece. On the other hand, the red color filter layers 17 each have a rectangular shape, and are separated from one another in an island-like arrangement. Thus, the total area of the blue color filter layers 18 in the common transition section 15 area is greater than that of the red color filter layers 17 in the common transition section 15 area. Therefore, light passing through the color filter layers 17 and 18 of two colors has a larger amount of the blue component than the red component, whereby the display as a whole in this area is dark, thus obtaining a transmission characteristic similar to that obtained when a black matrix is formed to cover the common transition section 15 area.

The blue color filter layer 18 in the common transition section 15 area is connected to the color filter layer 18 of the same color (blue) at a boundary 30 between the display area 14a and the frame area 14b. In other words, the blue color filter layer 18 in the common transition section 15 area is continuous, in the column direction, with the blue color filter layer 18 in the display area 14a in the vicinity of the boundary 30.

As illustrated in FIG. 4C, the blue (B) color filter layer 18 is a continuous layer at and around the boundary 30 between the display area 14a and the frame area 14b. The common electrode 11 on the blue (B) color filter layer 18 has a uniform thickness, and thus a reduced resistance, at and around the boundary 30. Therefore, the potential non-uniformity in the common electrode 11 can be eliminated, thereby improving the display quality.

Moreover, in the common transition section 15 area, the blue (B) color filter layer 18 as a whole has a net-like (or meshed) shape, extending not only in the in-plane column direction but also in the in-plane row direction, as illustrated in FIG. 4B. The common electrode 11 on the blue (B) color filter layer 18 has a uniform thickness in the common transition section 15 area. Therefore, a potential non-uniformity is not likely to occur across the common electrode 11 in the common transition section 15 area where the conductive paste 12 is applied.

In the present embodiment, the red color filter layer 17 in the frame area 14b in the vicinity of the boundary 30 is continuous, in the column direction, with the color filter layer 17 of the same color (red) in the display area 14a in the vicinity of the boundary 30. Thus, in order to reduce the resistance of the common electrode 11, it is preferred that the color filter layer in the display area 14a and the color filter layer of the same color in the frame area 14b are continuous with each other across the boundary 30 not only for the color filter layer 18 of one color (blue in the present embodiment) but also for the color filter layer of other color(s) (red in the present embodiment), as much as possible.

According to the present embodiment, it is possible to reduce the resistance of the common electrode 11 without increasing the number of the common transition electrodes 21 on the AM substrate 2 or the number of the common transition sections 15 on the CF substrate 3. Therefore, it is possible to meet the demand for display devices of a reduced frame area.

The AM substrate 2 and the CF substrate 3 are hermetically attached together via a sealant 5 applied along the periphery of the CF substrate 3, thereby giving a cell Before the AM substrate 2 and the CF substrate 3 are attached to each other, the conductive paste 12 is applied on the common transition electrodes 21 of the AM substrate 2. When the AM substrate 2 and the CF substrate 3 are attached to each other, the conductive paste 12 will be in contact with the common transition sections 15 of the common electrode 11 on the CF substrate 3. A liquid crystal material is injected through an opening in the sealant to form the liquid crystal layer 1. Moreover, a polarizing plate 7 for transmitting/blocking light that has been polarized through the liquid crystal layer 1 is provided on the outer side of each of the AM substrate 2 and the CF substrate 3. In order to ensure a sufficient brightness in a color display, a backlight is provided on the rear side of the AM substrate 2. The circuit substrate for driving the liquid crystal panel is connected to the signal input terminals provided in the frame area 14b of the AM substrate 2.

Figure 5A:
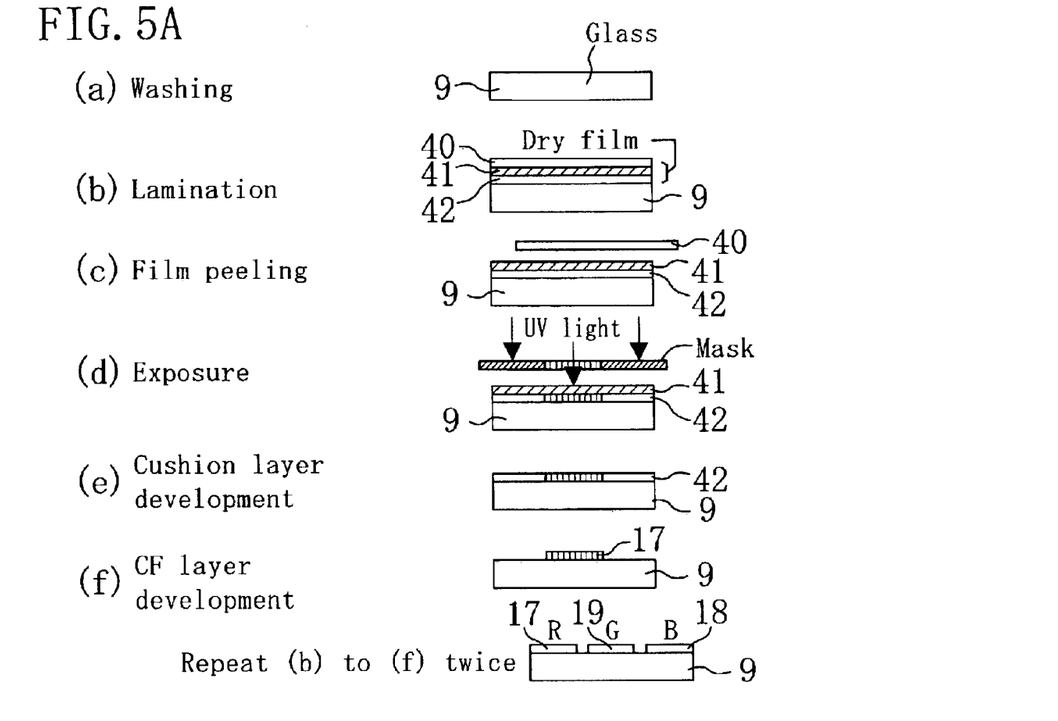
FIG. 5A and FIG. 5B illustrate a production flow according to a DFL method.
Figure 5B:
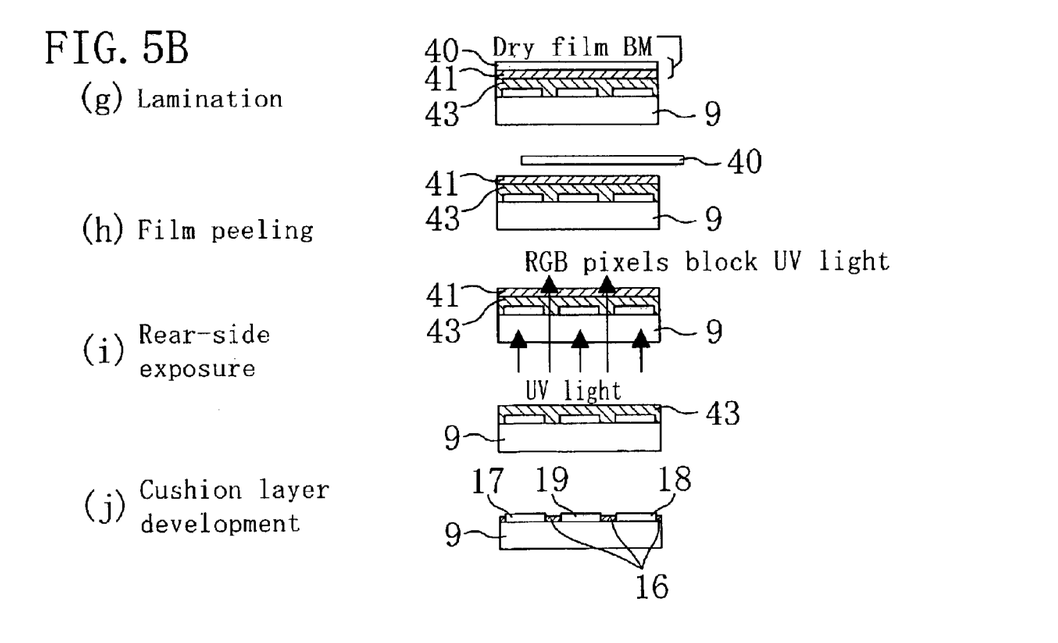

Next, a case where the CF substrate 3 used in the present embodiment is produced by a DFL (Dry Film Lamination) method will be described with reference to FIG. 5A and FIG. 5B. First, after the glass substrate 9 is washed (Step (a)), a dry film for a red color is laminated on one side of the glass substrate 9 (Step (b)). The dry film includes a colored photosensitive layer 42 with a red pigment dispersed therein, a cushion layer 41 and a protection film 40, which are deposited in this order. After the protection film 40 is peeled off (Step (c)), the structure is exposed to UV light via a photomask (Step (d)) to develop the cushion layer 41 (Step (e)). Furthermore, the colored photosensitive layer 42 is developed and subjected to a preliminary baking process, thereby forming (developing) the red color filter layer (Step (f)). Step (b) to Step (f) are repeated with a dry film for a green color and a dry film for a blue color to form the RGB color filter layers 17, 18 and 19.

A dry film BM with a black pigment dispersed therein is laminated on the structure (Step (g)), and the protection film 40 is peeled off (Step (h)). The structure is exposed from the rear side of the glass substrate 9 while using the color filter layers 17, 18 and 19 as a mask (Step (i)). Then, the cushion layer 41 is developed, and a colored photosensitive layer 43 is developed and subjected to a preliminary baking process (Step (j)), thereby forming the layer 16 to be a black matrix. Then, the substrate is inspected, after which it is washed and subjected to a main baking process.

With the DFL method, it is not necessary to control the amount of material to be applied so as to obtain a predetermined thickness, as in a spin coating method used in a pigment dispersion method. With the DFL method, a desired thickness can be obtained simply by using a dry film, which is produced with a predetermined thickness, and a uniform thickness can easily be obtained.

In the present embodiment, the R, G and B color filter layers are patterned, and then the black matrix is patterned. Alternatively, the color filter layers may be patterned after the black matrix is patterned. Moreover, the color filter layers may be formed by any of various methods, other than the DFL method as described in the present embodiment, such as a dye method, a pigment dispersion method, a printing method, an electrodeposition method, an ink jet method, etc.

After the color filter layers 17, 18 and 19 and the black matrix 16 are formed through the steps described above, a transparent conductive film such as ITO is formed by sputtering across the entire surface of the glass substrate 9. A transparent conductive film is patterned into a predetermined shape, i.e., a rectangular shape including the common transition sections 15, as illustrated in FIG. 2, thereby obtaining the common electrode 11.

Note that while FIG. 4A illustrates the common transition section 15 area on the upper side (in the column direction) of the common electrode 11 illustrated in FIG. 2, the color filter layers 17 and 18 of two colors in the common transition section 15 area on the left of the common electrode 11 illustrated in FIG. 2 are also in an arrangement as illustrated in FIG. 4A. Moreover, also in portions of the frame area 14b other than the common transition section 15 area, the blue (B) color filter layer 18 may be formed to extend in the column direction and in the row direction, as illustrated in FIG. 4A.

Embodiment 2

Figure 6:
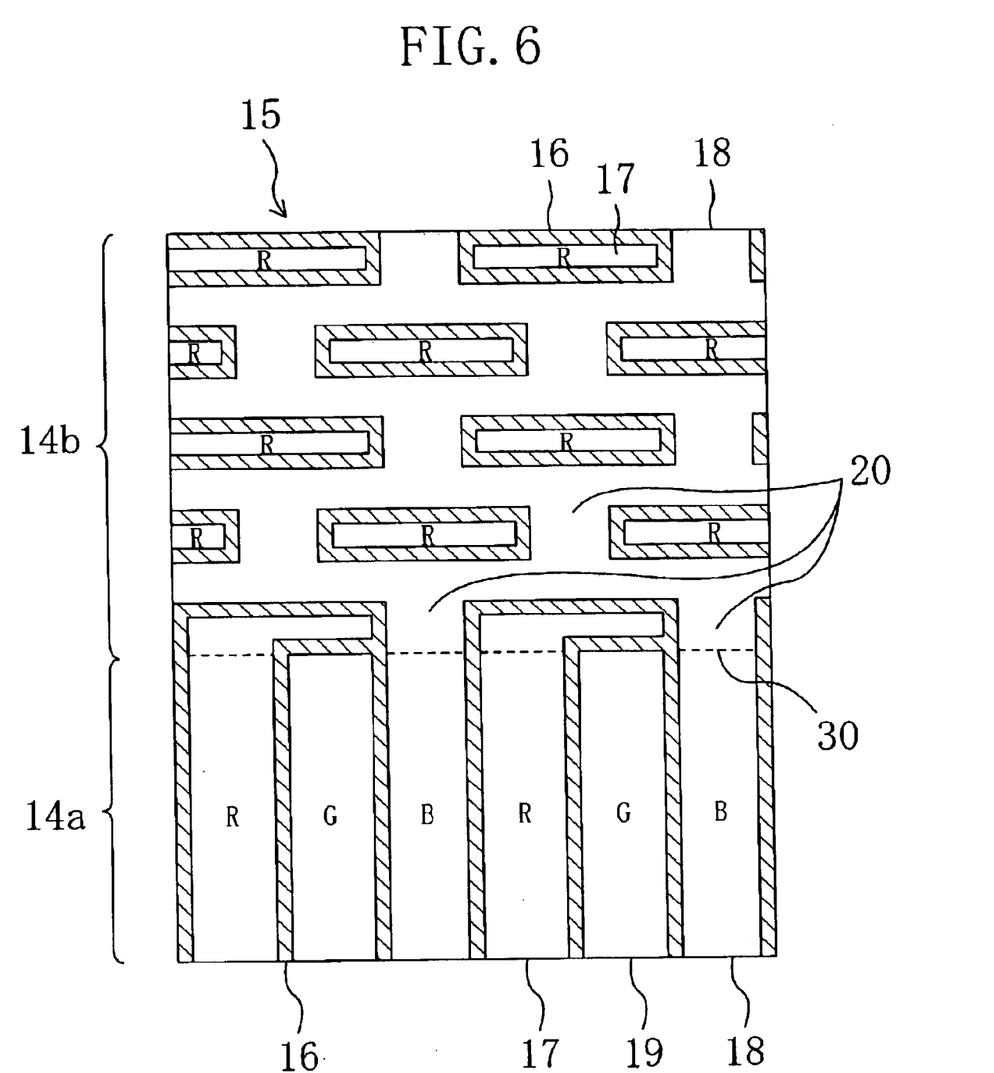
FIG. 6 is a plan view illustrating, on an enlarged scale, a portion of a CF substrate 3 used in Embodiment 2 around a common transition section 15.

In Embodiment 1, the blue color filter layer 18 extends in the column direction in the display area 14a and in the frame area 14b, while adjacent color filter layers 18 of the same color are connected to one another in the frame area 14b via the connecting portions 20 extending in the row direction. The shape of the color filter layers of the present invention is not limited to that illustrated in Embodiment 1, but may alternatively be a shape as illustrated in FIG. 6, for example. FIG. 6 is a plan view illustrating, on an enlarged scale, a portion of the CF substrate 3 used in the present embodiment around the common transition section 15.

While the shape of the color filter layers in the display area 14a illustrated in FIG. 6 is the same as that of Embodiment 1, the shape of the color filter layers in the common transition section 15 area is different from that of Embodiment 1. Specifically, the color filter layers 17 and 18 of two colors in the common transition section 15 area extend in the row direction, and the blue color filter layer 18 has a larger width in the column direction than that of the red color filter layer 17. The plurality of blue color filter layers 18 extending in the row direction are connected together via the connecting portions 20. Each connecting portion 20 has a rectangular shape and extends in the column direction. The connecting portion 20 along one row is shifted, in the row direction, from another connecting portion 20 along the next row by a predetermined interval. Thus, in the common transition section 15 area, the blue color filter layer 18 as a whole has a net-like (or meshed) shape, extending in the column direction and in the row direction, as in Embodiment 1. Moreover, the blue color filter layer 18 in the common transition section 15 area is connected to the red color filter layer 18 of the same color (blue) in the display area 14a in the vicinity of the boundary 30 via the connecting portions 20, and is continuous with the blue color filter layer 18 in the display area 14a in the vicinity of the boundary 30 across the boundary 30. Moreover, the color filter layer 17 in the frame area 14b in the vicinity of the boundary 30 is continuous, in the column direction, with the color filter layer 17 of the same color (red) in the display area 14a in the vicinity of the boundary 30.

Thus, in the CF substrate 3 of the present embodiment, the resistance of the common electrode 11 between the common transition section 15 area and the display area 14a is reduced, as in Embodiment 1. Therefore, the potential non-uniformity in the common electrode 11 can be eliminated, thereby improving the display quality.

Alternative Embodiments

While Embodiments 1 and 2 illustrate only examples where the colors of the color filter layers are the three primary colors of R, G and B, any other colors may alternatively be used. For example, three primary colors of cyan, magenta and yellow may be used, or four or more primary colors may be used. Moreover, a black matrix region may alternatively be formed in portions of the frame area 14b other than the common transition section 15 area. Furthermore, instead of forming a black matrix, a layer having a reflection or transmittance characteristic similar to that of a black matrix may alternatively be formed by, for example, depositing color filter layers of different colors on one another.

The arrangement of the color filter layers is not limited to a stripe arrangement as illustrated in Embodiments 1 and 2, and may alternatively be any other suitable arrangement, e.g., a delta arrangement, a mosaic arrangement, or a mixed arrangement of two or more of a stripe arrangement, a delta arrangement and a stripe arrangement. Moreover, the present invention is not limited to a case where the color filter layers in the common transition section 15 area are continuous in the column direction and in the row direction, as illustrated in Embodiments 1 and 2, and the color filter layers may alternatively be formed to extend in other two or more in-plane directions. For example, the color filter layers may be formed to extend in an oblique direction, in an oblique direction and the column direction, in an oblique direction and the row direction, in an oblique direction, the row direction and the column direction, etc. Furthermore, the color filter layer in the common transition section 15 area and the color filter layer in the display area 14a may be continuous with each other across the boundary 30 in any suitable direction, e.g., in the column direction, in the row direction, or in an oblique direction.

In the color display device of the present invention, the resistance of the common electrode can be reduced. Therefore, the potential non-uniformity in the common electrode can be eliminated, thereby improving the display quality.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A color display device, comprising:
   a first substrate and a second substrate opposing each other via a display medium layer interposed therebetween;
   a plurality of pixel electrodes arranged in a matrix pattern on one side of the first substrate that is closer to the display medium layer;
   a common electrode formed on one side of the second substrate that is closer to the display medium layer so as to oppose the plurality of pixel electrodes; and
   a plurality of color filter layers each having a different color formed between the second substrate and the common electrode, wherein:
      the common electrode and the color filter layers of different colors have a display area superposed on the plurality of pixel electrodes and a frame area outside a periphery of the display area;
      at least one of the plurality of color filter layers of different colors is continuous across a boundary between the display area and the frame area and is flat; and
      a color filter layer of a first color entirely surrounds an island of a color filter layer of a second color different than the first color on all lateral sides thereof in the frame area.

2. The color display device of claim 1, wherein:
   the plurality of color filter layers in the display area are color filter layers of three colors of red, green and blue;
   the plurality of color filter layers in the frame area are color filter layers of two colors of red and blue;
   the color filter layer continuous across the boundary is a blue color filter layer; and an area of the blue color filter layer in the frame area is greater than that of the red color filter layer in the frame area.

3. A color display device, comprising:
a first substrate and a second substrate opposing each other via a display medium layer interposed therebetween:
a plurality of pixel electrodes arranged in a matrix pattern on one side of the first substrate that is closer to the display medium layer;
a common electrode formed on one side of the second substrate that is closer to the display medium layer so as to oppose the plurality of pixel electrodes; and
a plurality of color filter layers each having a different color formed between the second substrate and the common electrode, wherein:
the common electrode and the color filter layers of different colors have a display area superposed on the plurality of pixel electrodes and a frame area outside a periphery of the display area;
at least one of the plurality of color filter layers of different colors is continuous across a boundary between the display area and the frame area and is flat
the first substrate includes, in the frame area, a common transition electrode that is connected to the common electrode via a conductive member;
the common electrode includes a common transition section in an area that is superposed on the common transition electrode; and
at least one of the plurality of color filter layers of different colors in an area that is superposed on the common transition section extends continuously into the display area and is flat.

4. The color display device of claim 3, wherein:
the plurality of color filter layers in the display area are color filter layers of three colors of red, green and blue;
the plurality of color filter layers in the frame area are color filter layers of two colors of red and blue;
the color filter layer continuous across the boundary is a blue color filter layer; and
an area of the blue color filter layer in the frame area is greater than that of the red color filter layer in the frame area.

5. A color display device, comprising:
a first substrate and a second substrate opposing each other via a display medium layer interposed therebetween;
a plurality of pixel electrodes arranged in a matrix pattern on one side of the first substrate that is closer to the display medium layer;
a common electrode formed on one side of the second substrate that is closer to the display medium layer so as to oppose the plurality of pixel electrodes; and
a plurality of color filter layers each having a different color formed between the second substrate and the common electrode, wherein:
the common electrode and the color filter layers of different colors have a display area superposed on the plurality of pixel electrodes and a frame area outside a periphery of the display area;
the first substrate includes, in the frame area, a common transition electrode that is connected to the common electrode via a conductive member;
the common electrode includes a common transition section in an area that is superposed on the common transition electrode; and at least one of the plurality of color filter layers of different colors in an area that is superposed on the common transition section extends in two or more in-plane directions and is flat.

6. The color display device of claim 5, wherein:
the plurality of color filter layers in the frame area are color filter layers of two colors of red and blue; and
an area of the blue color filter layer in the frame area is greater than that of the red color filter layer in the frame area.

7. The color display device of claim 5, wherein the at least one of the plurality of color filter layers of different colors extends continuously into the display area and is flat across a boundary between the display area and the frame area.

8. The display device of claim 1, wherein the plurality of color filter layers comprise first, second and third color filter layers of first, second and third colors, respectively, and wherein the first and second color filter layers of the first and second colors, but not the third color filter layer of the third color, are at least partially located in the frame area.

9. The display device of claim 1, wherein the display device is a liquid crystal display device.

10. A liquid crystal display comprising:
a first substrate and a second substrate opposing each other, with at least a liquid crystal layer therebetween;
a plurality of pixel electrodes arranged in a matrix pattern on the first substrate;
a common electrode formed on the second substrate so as to oppose the plurality of pixel electrodes with at least the liquid crystal layer therebetween; and
at least first, second and third color filter layers having respective first, second and third different colors formed at least partially between the second substrate and the common electrode;
a display area defined by an area where the pixel electrodes are provided, and a frame area at least partially surrounding the display area;
wherein at least the first color filter layer is continuous across a boundary between the display area and the frame area; and
wherein the first color filter layer of the first color entirely surrounds an island of the second color filter layer of the second color on all lateral sides thereof in the frame area.

11. The display of claim 10, wherein the first and second color filter layers, but not the third color filter layer, are at least partially located in the frame area outside of the display area.

12. The display of claim 10, wherein the common electrode includes a common transition section which protrudes outwardly from a periphery of the main body of the common electrode in the frame area, and wherein the common transition section of the common electrode at least partially overlaps a common transition electrode provided on the first substrate opposite the common electrode, wherein a conductive member electrically connects the common transition section of the common electrode to the common transition electrode on the other substrate.

13. A liquid crystal display comprising:
a first substrate and a second substrate opposing each other, with at least a liquid crystal layer therebetween;
a plurality of pixel electrodes arranged in a matrix pattern on the first substrate;
a common electrode formed on the second substrate so as to oppose the plurality of pixel electrodes with at least the liquid crystal layer therebetween; and at least first, second and third color filter layers having respective first, second and third different colors formed at least partially between the second substrate and the common electrode;

a display area defined by an area where the pixel electrodes are provided, and a frame area at least partially surrounding the display area; and wherein the first color filter layer of the first color entirely surrounds an island of the second color filter layer of the second color on all lateral sides thereof in the frame area.

* * * * *